United States Patent
Kawakami (10) Patent No.: US 7,340,975 B2
(45) Date of Patent: Mar. 11, 2008

(54) BICYCLE CONTROL APPARATUS WITH A POSITION SETTING IDLER MEMBER

(75) Inventor: Tatsuya Kawakami, Sakai (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 682 days.

(21) Appl. No.: 10/905,206

(22) Filed: Dec. 21, 2004

(65) Prior Publication Data
US 2006/0130602 A1  Jun. 22, 2006

(51) Int. Cl.
*F16C 1/10* (2006.01)
(52) U.S. Cl. ..................................... 74/502.2
(58) Field of Classification Search ............. 74/473.13, 74/473.3, 500.5, 501.6, 502.2
See application file for complete search history.

(56) References Cited

U.S. PATENT DOCUMENTS

| | | | |
|---|---|---|---|
| 5,325,735 A * | 7/1994 | Nagano | 74/502.2 |
| 5,588,331 A | 12/1996 | Huang et al. | |
| 5,622,083 A | 4/1997 | Kirimoto et al. | |
| 5,730,030 A * | 3/1998 | Masui | 74/473.13 |
| 5,755,139 A | 5/1998 | Kojima | |
| 5,799,542 A | 9/1998 | Yamane | |
| 5,921,139 A | 7/1999 | Yamane | |
| 6,467,368 B1 | 10/2002 | Feng et al. | |
| 6,564,670 B2 | 5/2003 | Feng et al. | |
| 6,718,844 B2 | 4/2004 | Hanatani | |
| 7,000,496 B2 * | 2/2006 | Wessel et al. | 74/502.2 |
| 2002/0112559 A1 | 8/2002 | Liu | |
| 2003/0150290 A1 | 8/2003 | Hanatani | |
| 2003/0188599 A1 | 10/2003 | Takachi | |

FOREIGN PATENT DOCUMENTS

| | | |
|---|---|---|
| EP | 863070 A2 | 9/1998 |
| EP | 1350715 A2 | 10/2003 |
| EP | 1378436 A1 | 1/2004 |

OTHER PUBLICATIONS

Unpublished U.S. Appl. No. 10/604,698; "Bicycle Twist-Grip Shift Control Device With Parallel Gearing" (Tang Foo Hou); filed Aug. 11, 2003.
European search report for EP 05025484.6, the European application that corresponds to this application, dated Nov. 14, 2006.
European search report for EP 05025484, the European application that corresponds to this application, dated Feb. 20, 2007.

* cited by examiner

*Primary Examiner*—Chong H Kim
(74) *Attorney, Agent, or Firm*—James A. Deland (57) ABSTRACT

A bicycle control apparatus comprises a first position setting member having a plurality of first positioning members with a first pitch, an operating member that rotates relative to the position setting member, and a second position setting member structured to rotate with the operating member and to move axially. The second position setting member has a plurality of second positioning members with a second pitch, wherein the first pitch is different from the second pitch. The first pitch and the second pitch are set so that an engagement pitch between a first engagement position of the second position setting member and a second engagement position of the second position setting member that results from rotation of the operating member is less than both the first pitch and the second pitch.

20 Claims, 6 Drawing Sheets

BICYCLE CONTROL APPARATUS WITH A POSITION SETTING IDLER MEMBER

BACKGROUND OF THE INVENTION

The present invention is directed to bicycles and, more particularly, to a bicycle control apparatus that uses an idler member to set the position of a takeup element.

U.S. Pat. No. 5,921,139 discloses an example of a bicycle control apparatus that uses an idler member to set the position of a takeup element. That apparatus comprises a base member with a plurality of first positioning members, an operating member mounted around a handlebar so as to rotate in first and second directions relative to the base member, a takeup element rotatably mounted around the base member for pulling and releasing a transmission control element, and an idler member with a plurality of second positioning members that engage the plurality of first positioning members on the base member. The idler member is coupled to the takeup element so that the idler member rotates integrally with the takeup element, but the idler member is capable of moving axially between engagement and disengagement positions with the base member to set various operating positions of the takeup element. The idler member includes first cam surfaces that cooperate with cam surfaces on the base member to move the idler member between the engagement and disengagement positions when the operating member rotates in the first direction to pull the transmission control element, and the idler member includes second cam surfaces that cooperate with cam surfaces on the operating member to move the idler member between the engagement and disengagement positions when the operating member rotates in the second direction to release the transmission control element.

The rotational positions of the takeup element are determined by the rotational pitch of the plurality of first and second positioning members. Thus, if it is desired to decrease the spacing between successive rotational positions of the takeup element, then it is necessary to decrease the rotational pitch of the plurality of first and second positioning members accordingly. If the positioning members have the form of ratchet teeth, then it becomes more difficult to manufacture the base member and idler member as the rotational pitch decreases. Decreased rotational pitch also usually requires decreased contact area between the first and second positioning members, thus decreasing engagement strength between the idler member and the base member and risking undesirable turning of the takeup element in the wire unwinding direction.

Another design consideration of bicycle control devices is the ability to transfer operating forces between the operating member and the takeup element. Operating forces in conventional designs are transferred between the operating member and the takeup element through the idler member. As a result, large operating forces can result in correspondingly large wear forces applied to the various cam surfaces, thus decreasing service life of the control device.

SUMMARY OF THE INVENTION

The present invention is directed to various features of a bicycle control apparatus. In one embodiment, a bicycle control apparatus comprises a first position setting member having a plurality of first positioning members with a first pitch, an operating member that rotates in first and second directions relative to the position setting member around a rotational axis, and a second position setting member structured to rotate with the operating member and to move axially. The second position setting member has a plurality of second positioning members with a second pitch, wherein the first pitch is different from the second pitch. When the operating member rotates, the second position setting member moves between an engagement position, wherein at least one of the plurality of second positioning members engages at least one of the plurality of first positioning members, and a disengagement position wherein the second position setting member is disengaged from the first position setting member. The first pitch and the second pitch are set so that an engagement pitch between a first engagement position of the second position setting member and a second engagement position of the second position setting member that results from rotation of the operating member is less than both the first pitch and the second pitch.

In another embodiment, a bicycle control apparatus comprises a position setting member; an operating member that rotates in first and second directions relative to the position setting member around a rotational axis; and a takeup element rotatably mounted relative to the position setting member for controlling the pulling and releasing of a transmission control element, wherein the takeup element is directly rotated by the operating member in the pulling of the transmission control element. An idler member engages the operating member and the position setting member so that the idler member rotates when the operating member rotates in the first direction and moves axially between an engagement position and a disengagement position with the position setting member when the operating member rotates in the second direction.

Additional inventive features will become apparent from the description below, and such features alone or in combination with the above features may form the basis for further inventions as recited in the claims and their equivalents.

DETAILED DESCRIPTION OF THE EMBODIMENTS

Figure 1:
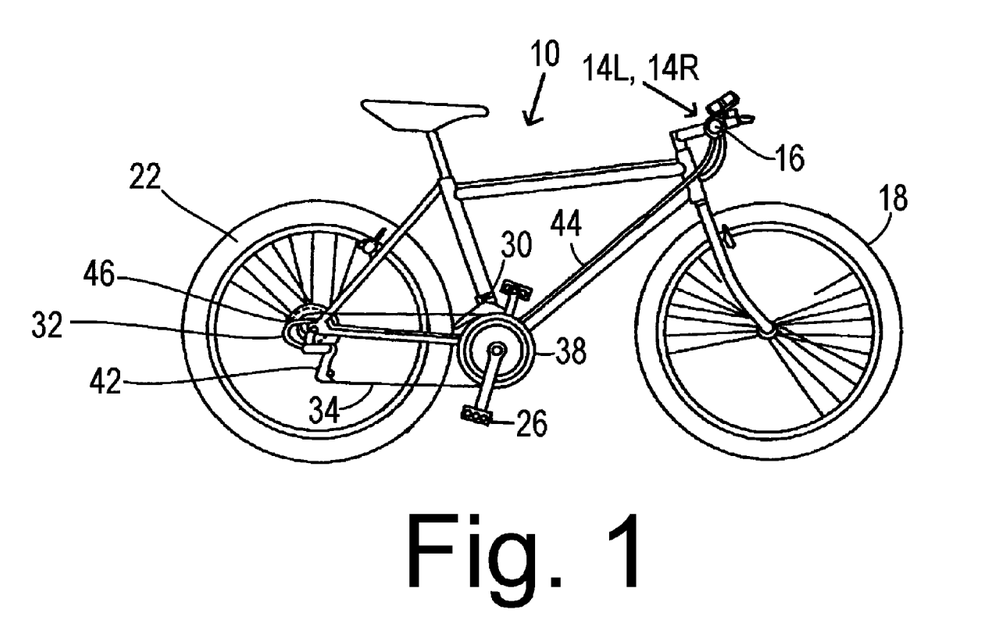
FIG. 1 is a side view of a bicycle that incorporates particular embodiments of shift control devices.

FIG. 1 shows a bicycle 10 provided with particular embodiments of left and right shift control devices 14L and 14R (FIG. 2) attached to a handlebar 16. Bicycle 10 is equipped with a front wheel 18, a rear wheel 22, pedals 26, a front derailleur 30 operated by shift control device 14L through a Bowden style control cable 44 for switching a chain 34 among a plurality of front sprockets 38, and a rear derailleur 42 operated by shift control device 14R through a Bowden style control cable 32 for switching chain 34 among a plurality of rear sprockets 46.

Figure 2:
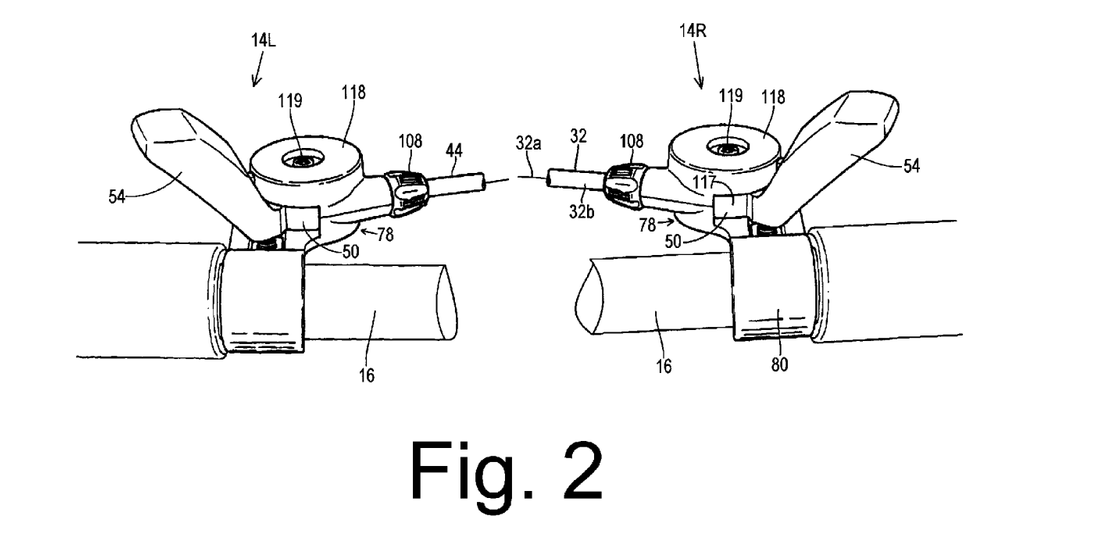
FIG. 2 is a rear view of the shift control devices attached to the handlebar.
Figure 3:
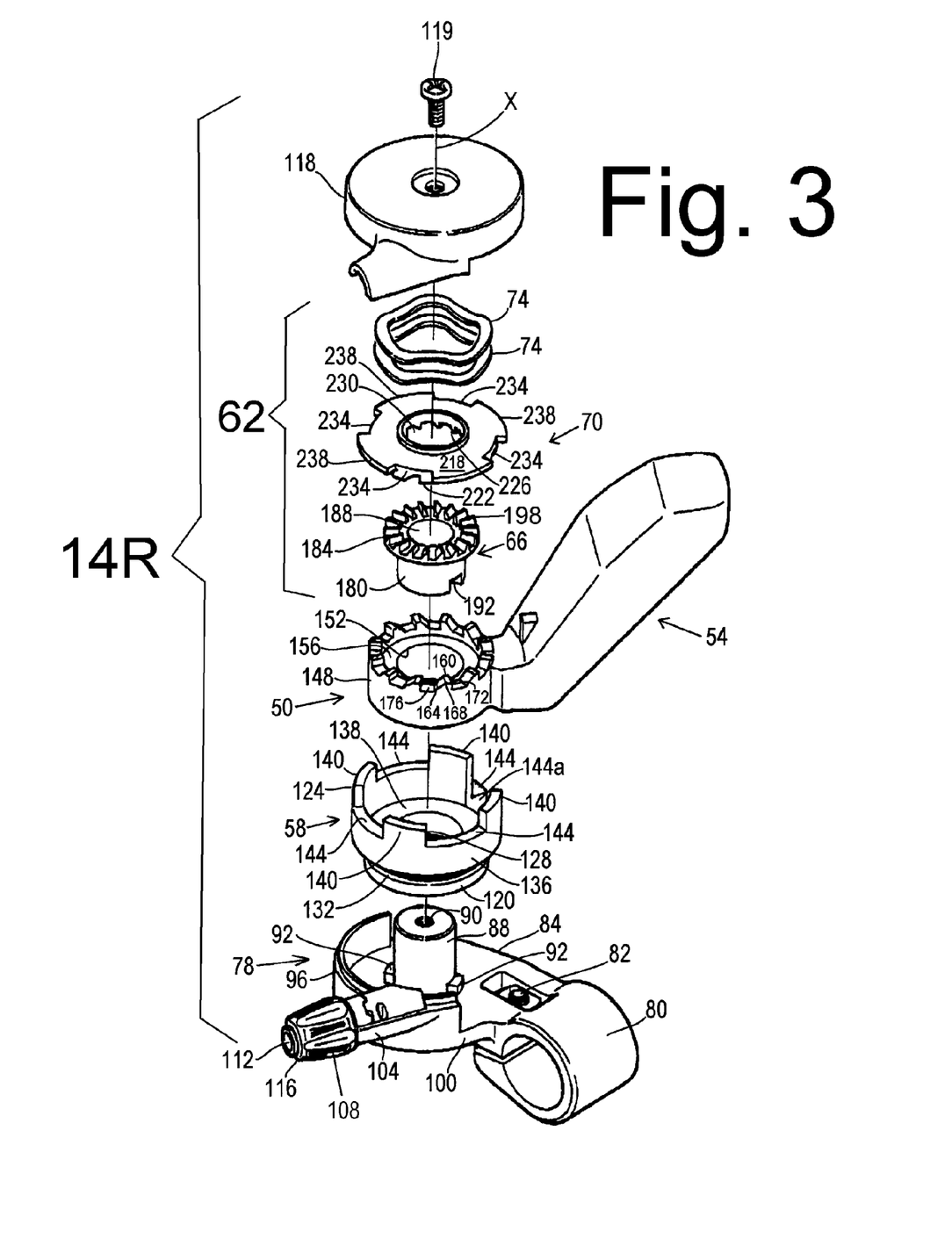
FIG. 3 is an exploded view of the right side shift control device shown in FIG. 2.

FIG. 2 is a rear view of shift control devices 14L and 14R attached to handlebar 16, and FIG. 3 is an exploded view of shift control device 14R. Shift control device 14L is constructed substantially the same as shift control device 14R except for the number of gears accommodated, so only shift control device 14R shall be described. In general, rotating an operating member 50 around an axis X using a lever 54 rotates a wire takeup element 58 which, in turn, pulls and releases an inner wire 32a of control cable 32 to operate rear derailleur 42. A positioning unit 62 comprising a first position setting member 66, a second position setting (idler) member 70 and a pair of spring washers 74 maintains takeup element 58 in a plurality of predetermined rotational positions corresponding to sprocket positions of rear derailleur 42.

More specifically, shift control device 14R includes a lower housing 78 that is fixed to handlebar 16 through a clamping band 80 using a screw 82 in a conventional manner. Lower housing 78 includes a bottom wall 84 attached to clamping band 80, a mounting post 88 with a threaded opening 90 extending perpendicularly upward from bottom wall 84, and a pair of diametrically opposed fixing projections 92 disposed at the intersection of bottom wall 84 and mounting post 88. An approximately semicircular side wall 96 extends perpendicularly upward from an outer peripheral arcuate edge 100 of bottom wall 84. Side wall 96 supports a cable guide 104 that guides inner wire 32a of control cable 32 to takeup element 58. A conventional cable adjusting barrel 108 screws onto the end of cable guide 104. Cable adjusting barrel 108 includes a cable passage 112 for receiving inner wire 32a therethrough and an outer casing stop 116 for terminating an outer casing 32b of control cable 32 in a known manner. A top cover 118 attaches to mounting post 88 using a screw 119 that screws into threaded opening 90 for enclosing operating member 50, wire takeup element 58 and positioning unit 62. Lower housing 78 and top cover 118 define an opening 117 (FIG. 2) for receiving lever 54 therethrough and accommodating the range of motion of lever 54.

Takeup element 58 comprises an annular takeup drum 120 and an operating member support member 124. Takeup drum 120 includes a central opening 128 and a wire winding groove 132, wherein takeup drum 120 rotatably encircles mounting post 88 with a space therebetween, and wire winding groove 132 winds and unwinds inner wire 32a. Takeup drum 120 also includes a conventional cable terminating opening (not shown) for supporting a conventional cable end bead (not shown) attached to the end of inner wire 32a to fix the end of inner wire 32a to wire winding groove 132. Operating member support member 124 is a castellated member comprising a side wall 136 that extends perpendicularly upward from a bottom wall 138 formed by takeup drum 120. Side wall 136 forms a plurality of merlons 140 interleaved with a plurality of crenels 144, wherein a crenel 144a extends to bottom wall 138 and is dimensioned to receive lever 54 therein. Because rotational force applied to lever 54 is directly transferred to takeup element 58 in a pulling of inner wire 32a, excessive wear forces applied to the positioning elements described below are avoided.

Operating member 50 comprises an annular body 148 with a central opening 152, an annular ledge 156 and a plurality of coupling members in the form of coupling teeth 160. Lever 54 extends radially outwardly from annular body 148. Annular body 148 and annular ledge 156 rotatably encircle mounting post 88 with a space therebetween. Coupling teeth 160 extend upwardly from annular body 148 and encircle annular body 148. In this embodiment, each coupling tooth 160 includes a cam surface 164, a generally flat top surface 168, and a coupling surface 172. Cam surface 164 extends upwardly at an incline from a coupling tooth floor 176 formed by annular body 148, top surface 168 extends from cam surface 164 generally parallel to coupling tooth floor 176, and coupling surface 172 extends from top surface 168 to coupling tooth floor 176 generally perpendicular to both top surface 168 and coupling tooth floor 176.

First position setting member 66 comprises a cylindrical bushing 180 and an annular position setting member in the form of a position setting disk 184. Bushing 180 includes a central opening 188 and a pair of diametrically opposed notches 192 (only one notch is shown in FIG. 3), wherein opening 188 is dimensioned to receive mounting post 88 therein, and notches 192 engage fixing projections 92 at bottom wall 84 of lower housing 78 so that first position setting member 66 is nonrotatably fixed to mounting post 88. As a result, bushing 180 is disposed between mounting post 88 and both operating member 50 and takeup element 58 so that operating member 50 and takeup element 58 are rotatably supported to mounting post 88 via bushing 180.

Figure 4:
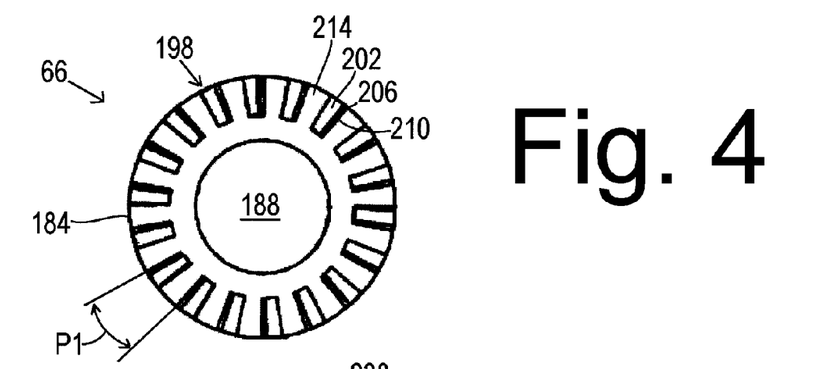
FIG. 4 is a plan view of a particular embodiment of positioning members on a position setting member.

As shown in FIGS. 3 and 4, a plurality of positioning members in the form of positioning teeth 198 extend upwardly from position setting disk 184 and encircle position setting disk 184. In this embodiment each positioning tooth 198 includes a cam surface 202, a generally flat short top surface 206, and a positioning surface 210. Cam surface 202 extends upwardly at an incline from a positioning tooth floor 214 formed by position setting disk 184, top surface 206 extends from cam surface 202 generally parallel to positioning tooth floor 214, and positioning surface 210 extends from top surface 206 to positioning tooth floor 214 generally perpendicular to both top surface 206 and positioning tooth floor 214. The plurality of positioning teeth 198 encircle position setting disk 184 with a first pitch P1.

Figure 5:
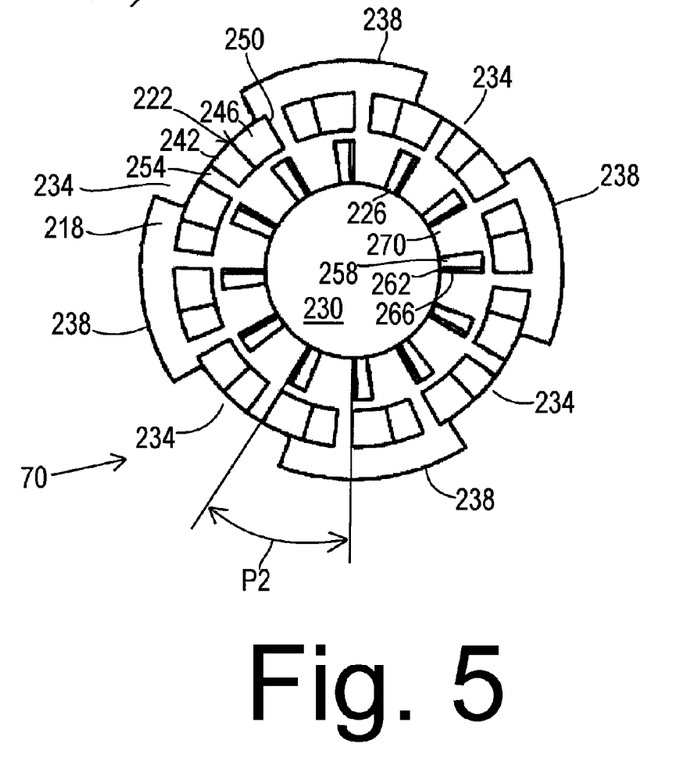
FIG. 5 is a plan view of a particular embodiment of positioning members and coupling members on an idler member.

As shown in FIGS. 3 and 5, idler member 70 comprises an annular fixing disk 218, a plurality of coupling members in the form of coupling teeth 222, and a plurality of positioning members in the form of positioning teeth 226. Fixing disk 218 includes a central opening 230 dimensioned to fit around mounting post 88, a plurality of radially inwardly extending splines 234, and a plurality of radially outwardly extending splines 238. Each radially inwardly extending spline 234 engages a corresponding merlon 140 on operating member support member 124, and each radially outwardly extending spline 238 engages a corresponding crenel 144 in operating member support member 124. As a result, idler member 70 is nonrotatably fixed to takeup element 58 but is capable of movement relative to takeup element 58 in the direction of rotational axis X.

Coupling teeth 222 extend upwardly from fixing disk 218 and encircle fixing disk 218. In this embodiment, each coupling tooth 222 includes a cam surface 242, a generally flat top surface 246, and a coupling surface 250. Cam surface 242 extends upwardly at an incline from a coupling tooth floor 254 formed by fixing disk 218, top surface 246 extends from cam surface 242 generally parallel to coupling tooth floor 254, and coupling surface 250 extends from top surface 246 to coupling tooth floor 254 generally perpendicular to both top surface 246 and coupling tooth floor 254.

Positioning teeth 226 extend upwardly from fixing disk 218 and encircle fixing disk 218. In this embodiment, each positioning tooth 226 includes a cam surface 258, a generally flat short top surface 262, and a positioning surface 266. Cam surface 258 extends upwardly at an incline from a positioning tooth floor 270 formed by fixing disk 218, top surface 262 extends from cam surface 258 generally parallel to positioning tooth floor 270, and positioning surface 266 extends from top surface 262 to positioning tooth floor 270 generally perpendicular to both top surface 262 and positioning tooth floor 270. The plurality of positioning teeth 226 encircle fixing disk 218 with a second pitch P2. In this embodiment, second pitch P2 is different from first pitch P1. Preferably, but not necessarily, second pitch P2 is greater than first pitch P1 by approximately 50% for reasons discussed below.

Figure 6A:
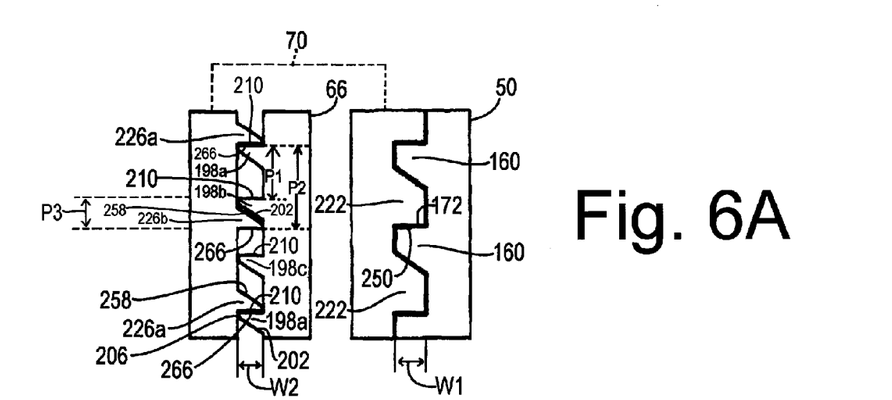
FIGS. 6A-6C are schematic views showing the operation of the shift control device when the operating member rotates in a first direction.

Spring washers 74 are disposed between top cover 118 and fixing disk 218 of idler member 70 and bias idler member 70 downwardly in the direction of axis X toward operating member 50 and first position setting member 66. As a result, coupling teeth 160 on operating member 50 engage coupling teeth 222 on idler member 70, and positioning teeth 198 on first position setting member 66 engage positioning teeth 226 on idler member 70. As best seen in FIG. 6A, coupling surfaces 172 and 250 have a width W1, and positioning surfaces 210 and 266 have a width W2, wherein width W1 is greater than width W2.

Figure 6B:
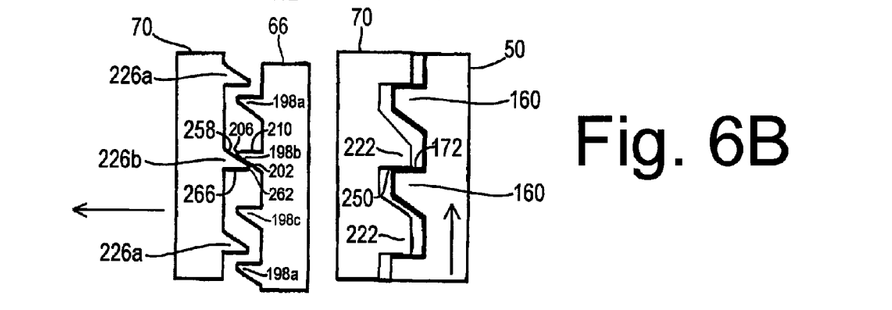
Figure 6C:
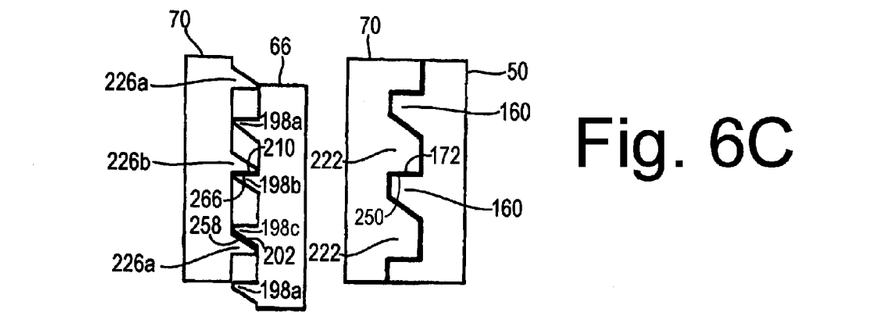

The manner in which operating member 50, first position setting member 66 and idler member 70 move when operating member 50 rotates in the wire pulling direction in response to counterclockwise rotation of lever 54 is shown in FIGS. 6A-6C. In the rest position shown in FIG. 6A, coupling surfaces 172 of operating member 50 abut against coupling surfaces 250 of idler member 70. On the other hand, since the pitch P2 of positioning teeth 226 on idler member 70 is different from the pitch P1 of positioning teeth 198 of first position setting member 66, not all of the positioning surfaces 210 of first position setting member 66 contact a corresponding positioning surface 266 on idler member 70. Instead, positioning surfaces 210 of positioning teeth 198a of first position setting member 66 contact positioning surfaces 266 of positioning teeth 226a of idler member 226, whereas positioning surfaces 210 of positioning teeth 198b and 198c of first position setting member 66 (only one each of such positioning teeth 198b and 198c is shown in FIG. 6A) do not contact positioning surfaces 266 of positioning teeth 226b of idler member 70 (only one such positioning tooth 198b is shown in FIG. 6A). In this configuration, cam surfaces 202 of positioning teeth 198b of first position setting member 66 are disposed in close proximity to corresponding cam surfaces 258 of positioning teeth 226b.

When operating member 50 is rotated in the wire pulling direction (shown by the upwardly directed arrow in FIG. 6B), coupling teeth 172 on operating member 50 press against coupling teeth 250 on idler member 70, thus rotating idler member counterclockwise in FIGS. 1 and 3. At that time, cam surfaces 258 of positioning teeth 226b of idler member 70 press against cam surfaces 202 of positioning teeth 198b of first position setting member 66. Since first position setting member 66 is fixed to mounting post 88, first position setting member 66 remains stationary, and idler member 70 moves upwardly in the direction of axis X (to the left in FIG. 6B) as a result of the sliding action of cam surfaces 202 and 258 of positioning teeth 198b and 226b.

Further rotation of operating member 50 in the wire pulling direction causes top surfaces 206 and 262 of positioning teeth 198b and 226b to slide over each other until positioning teeth 226b of idler member 70 jump over positioning teeth 198b of first positioning member 66, and positioning surfaces 266 of positioning teeth 226b of idler member 70 contact positioning surfaces 210 of positioning teeth 198b of first position setting member 66 as shown in FIG. 6C. At this time, the cam surfaces 202 of positioning teeth 198c of first position setting member 66 are disposed in close proximity to cam surfaces 258 of positioning teeth 226a of idler member 70. Since the widths W1 of coupling surfaces 172 and 250 of operating member 50 and idler member 70 are greater than the widths W2 of positioning surfaces 210 and 266 of first position setting member 66 and idler member 70, idler member 70 never fully disengages from operating member 50, so idler member 70 merely returns to the same axial position relative to operating member 50.

It should be readily apparent that an engagement pitch P3 between the first engagement position of idler member 70 shown in FIG. 6A and the second engagement position of idler member 70 shown in FIG. 6C that results from rotation of operating member 50 is less than both pitch P1 of positioning teeth 198 of first positioning member 66 and pitch P2 of positioning teeth 226 of idler member 70. Accordingly, operating member 50, and hence takeup element 58, also rotate a total distance less than both pitch P1 of positioning teeth 198 and pitch P2 of positioning teeth 226. In this embodiment, since pitch P2 is approximately 50% greater than pitch P1, the engagement pitch P3 is approximately one-half of pitch P1. Instead of decreasing the pitch of the positioning teeth to reduce the engagement pitch as in the prior art, the engagement pitch is reduced by actually increasing the pitch of the positioning teeth as taught herein. This avoids both the increased manufacturing cost and complexity as well as the decreased reliability that results from conventional techniques.

Figure 7A:
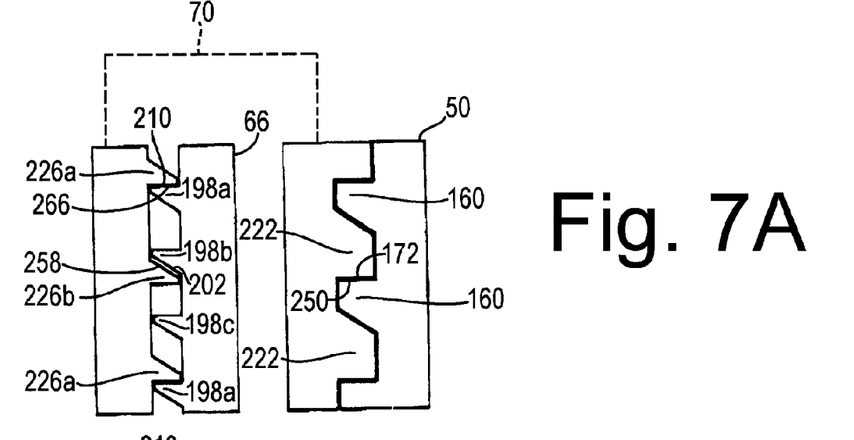
FIGS. 7A-7C are schematic views showing the operation of the shift control device when the operating member rotates in a second direction.
Figure 7B:
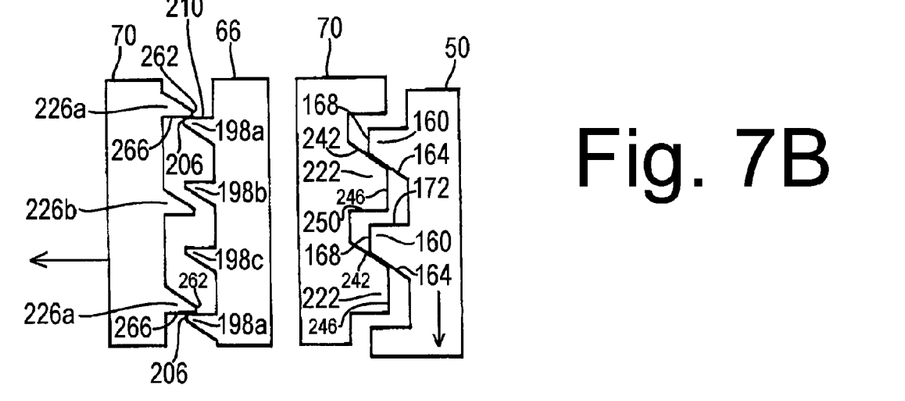
Figure 7C:
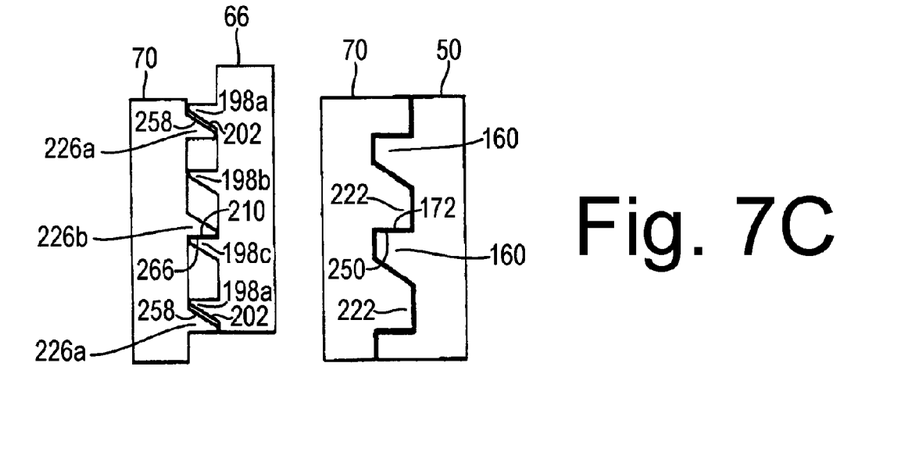

The manner in which operating member 50, first position setting member 66 and idler member 70 move when operating member 50 rotates in the wire releasing direction in response to clockwise rotation of lever 54 is shown in FIGS. 7A-7C. The rest position shown in FIG. 7A is the same as the rest position shown in FIG. 6A. When operating member 50 rotates in the wire releasing direction (shown by the downwardly directed arrow in FIG. 7B), cam surfaces 164 of coupling teeth 160 of operating member 50 press against cam surfaces 242 of coupling teeth 222 of idler member 70. Since first position setting member 66 is fixed to mounting post 88, idler member 70 does not rotate at this time because of the engagement between positioning teeth 198a and 226a. Instead, idler member 70 moves upwardly in the direction of axis X (to the left in FIG. 7B) as a result of the sliding action of cam surfaces 164 and 242 of coupling teeth 160 and 222 of operating member 50 and idler member 70, respectively.

Further rotation of operating member 50 in the wire releasing direction causes top surfaces 206 and 262 of positioning teeth 198a and 226a of first position setting member 66 and idler member 70, respectively, to slide over each other until positioning teeth 226a of idler member 70 jump over positioning teeth 198a of first positioning member 66, and positioning surfaces 266 of positioning teeth 226b of idler member 70 contact positioning surfaces 210 of positioning teeth 198c of first position setting member 66 as shown in FIG. 7C. At this time, the cam surfaces 202 of positioning teeth 198a of first position setting member 66 are disposed in close proximity to cam surfaces 258 of positioning teeth 226a of idler member 70. Once again, since the widths W1 of coupling surfaces 172 and 250 of operating member 50 and idler member 70 are greater than the widths W2 of positioning surfaces 210 and 266 of first position setting member 66 and idler member 70, idler member 70 never fully disengages from operating member 50, so idler member 70 merely returns to the same rotational position relative to operating member 50. The net result is that operating member 50 and takeup element 58 again have rotated by an engagement pitch P3 of approximately one-half of pitch P1.

While the above is a description of various embodiments of inventive features, further modifications may be employed without departing from the spirit and scope of the present invention. For example, some play or slack could be designed into the mechanical connection between takeup element 58 and idler member 70 to accomplish overshift of the derailleurs in a known manner. The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle control apparatus comprising:
   a first position setting member having a plurality of first positioning members with a first pitch;
   an operating member that rotates in first and second directions relative to the position setting member around a rotational axis;
   a second position setting member structured to rotate with the operating member and to move axially;
   wherein the second position setting member has a plurality of second positioning members with a second pitch;
   wherein the first pitch is different from the second pitch;
   wherein, upon rotation of the operating member, the second position setting member moves between an engagement position, wherein at least one of the plurality of second positioning members engages at least one of the plurality of first positioning members, and a disengagement position wherein the second position setting member is disengaged from the first position setting member; and
   wherein the first pitch and the second pitch are set so that an engagement pitch between a first engagement position of the second position setting member and a second engagement position of the second position setting member that results from rotation of the operating member is less than both the first pitch and the second pitch.

2. The apparatus according to claim 1 wherein one of the first pitch and the second pitch is approximately 50% greater than the other one of the first pitch and the second pitch.

3. The apparatus according to claim 1 wherein a first positioning surface of a selected first positioning member engages a corresponding second positioning surface of a selected second positioning member when the second position setting member is in the engagement position, and wherein the first positioning surface of another first positioning member does not engage the second positioning surface of a corresponding another second positioning member when the second position setting member is in the engagement position.

4. The apparatus according to claim 3 wherein the another first positioning member is structured to engage the another second positioning member to move the second position setting member axially toward the disengagement position when the operating member rotates.

5. The apparatus according to claim 4 wherein the another first positioning member is disposed in close proximity to the another second positioning member when the second position setting member is in the engagement position.

6. The apparatus according to claim 5 wherein the another first positioning member and the another second positioning member each includes a cam surface that causes the second position setting member to move axially toward the disengagement position when the operating member rotates.

7. The apparatus according to claim 6 wherein the another first positioning member includes a first cam surface, and wherein the another second positioning member includes a second cam surface that engages the first cam surface when the operating member rotates to cause the second position setting member to move axially toward the disengagement position.

8. The apparatus according to claim 7 wherein the first cam surface is disposed in close proximity to the second cam surface when the second position setting member is in the engagement position.

9. The apparatus according to claim 1 wherein the second position setting member rotates when the operating member rotates in the first direction, and wherein the second position setting member moves axially toward the disengagement position when the operating member rotates in both the first direction and the second direction.

10. The apparatus according to claim 9 wherein a first positioning surface of a selected first positioning member engages a corresponding second positioning surface of a selected second positioning member when the second position setting member is in the engagement position, and wherein the first positioning surface of another first positioning member does not engage the second positioning surface of a corresponding another second positioning member when the second position setting member is in the engagement position.

11. The apparatus according to claim 10 wherein the another first positioning member is structured to engage the another second positioning member to move the second positioning member axially toward the disengagement position when the operating member rotates.

12. The apparatus according to claim 10 further comprising:
    a first coupling member that moves in response to rotation of the operating member; and
    a second coupling member coupled to the second position setting member for engaging the first coupling member so that rotation of the operating member causes rotation of the second position setting member.

13. The apparatus according to claim 12 wherein at least one of the first position setting member and the second position setting member includes a position setting member cam surface that causes the second position setting member to move axially toward the disengagement position when the operating member rotates in the first direction, and wherein at least one of the first coupling member and the second coupling member includes a coupling member cam surface that causes the second position setting member to move axially toward the disengagement position when the operating member rotates in the second direction.

14. The apparatus according to claim 13 further comprising a takeup element that controls the pulling and releasing of a transmission control element, wherein the takeup element rotates in response to rotation of the second position setting member.

15. A bicycle control apparatus comprising:
- a position setting member;
- an operating member that rotates in first and second directions relative to the position setting member around a rotational axis;
- a takeup element rotatably mounted relative to the position setting member for controlling the pulling and releasing of a transmission control element, wherein the takeup element is directly rotated by the operating member in the pulling of the transmission control element; and
- an idler member that engages the operating member and the position setting member so that the idler member rotates when the operating member rotates in the first direction and moves axially between an engagement position and a disengagement position with the position setting member when the operating member rotates in the second direction.

16. The apparatus according to claim 15 wherein the operating member comprises a lever.

17. The apparatus according to claim 15 wherein the idler member moves axially between the engagement position and the disengagement position with the position setting member when the operating member rotates in the first direction.

18. The apparatus according to claim 17 wherein one of the operating member and the takeup element is disposed in a recess in the other one of the operating member and the takeup element.

19. The apparatus according to claim 17 wherein the position setting member is disposed between the operating member and the idler member.

20. The apparatus according to claim 19 wherein the operating member is disposed between the takeup element and the idler member.

* * * * *